Figure 1:
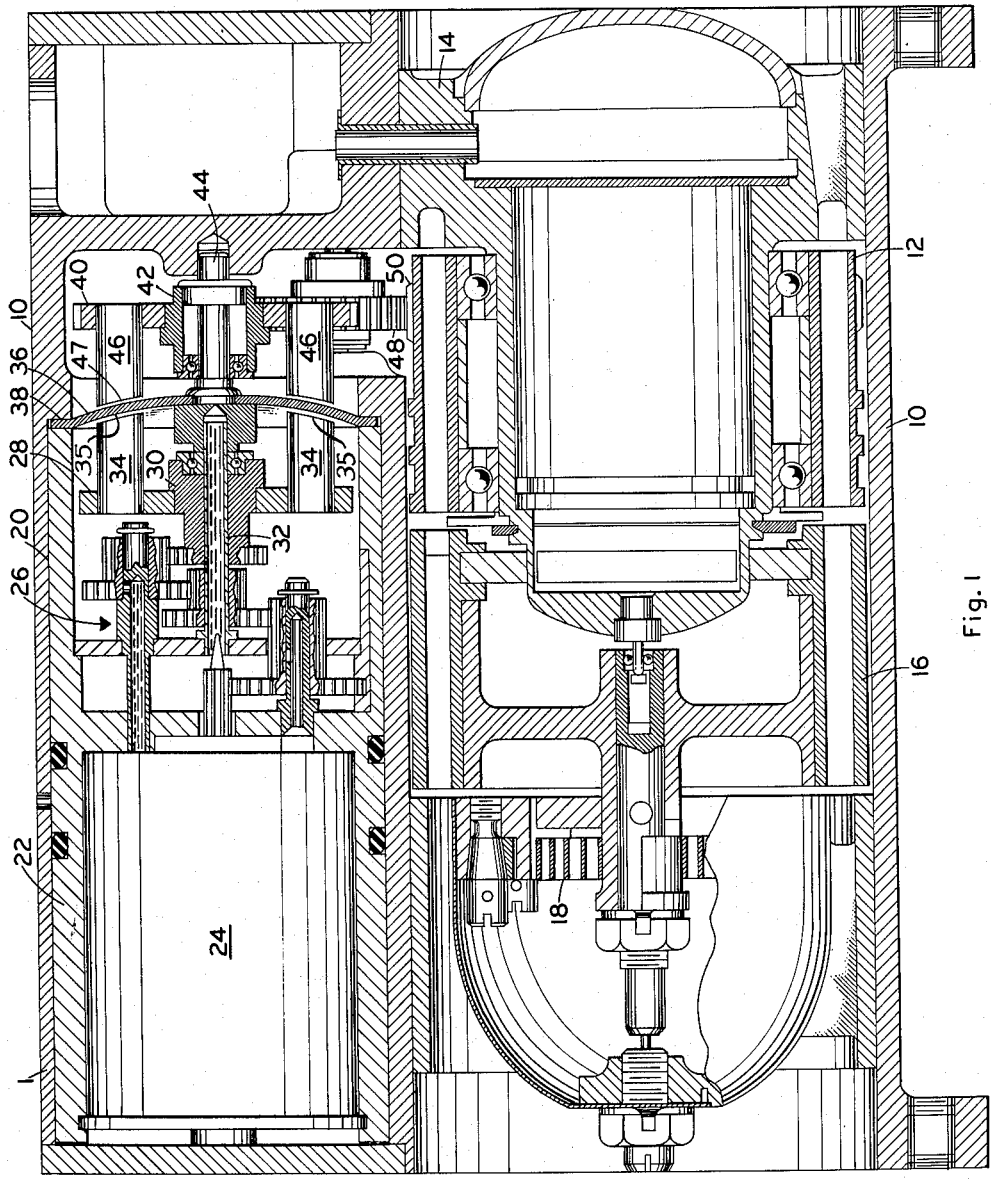

March 27, 1962 P. K. BODGE 3,027,473
MAGNETIC DRIVE ASSEMBLY
Filed Jan. 2, 1959 2 Sheets-Sheet 1

INVENTOR.
Philip K. Bodge
BY M W Goodwin
His Attorney

March 27, 1962  P. K. BODGE  3,027,473
MAGNETIC DRIVE ASSEMBLY
Filed Jan. 2, 1959  2 Sheets-Sheet 2

INVENTOR.
Philip K. Bodge
BY M W Goodwin

His Attorney

United States Patent Office 3,027,473
Patented Mar. 27, 1962

3,027,473
MAGNETIC DRIVE ASSEMBLY
Philip K. Bodge, Swampscott, Mass., assignor to General Electric Company, a corporation of New York
Filed Jan. 2, 1959, Ser. No. 784,521
1 Claim. (Cl. 310—104)

This invention relates to a magnetic drive assembly and more particularly to a magnetic drive assembly adapted for use in fluid mass flowmeters and like devices wherein it is desired to provide a fluid tight seal between a drive motor and components driven by the motor.

There are generally two known types of magnetic couplings which may be used for transmitting torque through a fluid tight seal from a drive motor to other operating components in an associated device. These couplings are often referred to as axial couplings or radial couplings, depending on whether they provide axial or radial polarization. While the radial coupling is satisfactory for many purposes, it normally requires a substantially greater cross-sectional area to contain it than does the axial coupling. However, previous axial couplings, while satisfying a reduction in radial space requirement, have generally had at least one disadvantage; i.e., where it is necessary to provide a fluid tight seal between the magnets of the coupling, it has been a practice to provide a flat circular diaphragm or seal member in the air gap between the magnets which cooperates with the housing of the drive assembly to seal the magnets from each other.

In order to provide a magnetic coupling which is physically small to meet certain requirements of compactness, present particularly in devices for installation in aircraft, and yet provide a high torque transmitting device, it is necessary to maintain the air gap between the magnets at a minimum. This would indicate the use of a thin diaphragm or seal member between the magnets. However, in the case where a high differential fluid pressure is present across the diaphragm, the diaphragm or seal member must be made sufficiently thick to withstand this pressure differential with the attendant disadvantages of undesirably increasing the air gap between the magnets and lowering the efficiency of torque transmission between the magnets.

Accordingly, it is the primary object of this invention to provide a magnetic drive assembly of novel and improved construction wherein the magnets are sealed one from the other in a manner to withstand relatively high differential pressures across the seal while at the same time providing improved torque transmission efficiencies between the magnets.

Other objects will be in part obvious and more particularly pointed out in more detail hereinafter.

The primary object of this invention is achieved, in one embodiment thereof, by providing a seal member between a pair of cooperating magnets of a magnetic drive assembly, with the seal member cooperating with a housing for the assembly to provide a fluid tight seal between the magnets and, in accordance with the invention, with the portion of the seal member registering with the locus of the magnets being provided on opposite sides thereof with surfaces of revolution disposed coaxially of the magnets and inclined toward the axis of one of the magnets. The cooperating pole faces of the magnets are configured to be generally complementary to the next adjacent surfaces of revolution of the seal member so as to permit their location as close together as possible. With this construction, the portion of the seal member registering with the locus of the magnets may be constructed with a thinner cross section to minimize the air gap between the magnets while at the same time being capable of withstanding high differential fluid pressures thereacross.

Figure 2:
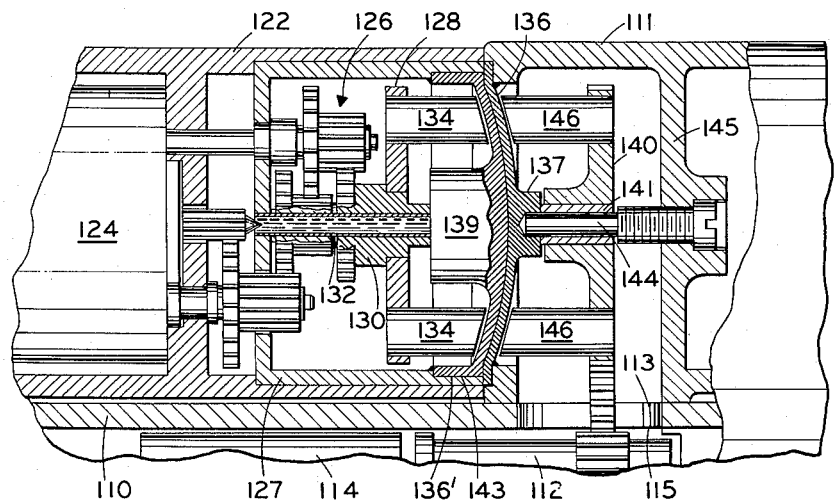

A more detailed understanding of the invention may be had by reference to the following description taken in connection with the accompanying drawings in which:

FIG. 1 is a cross-sectional view of a fluid mass flowmeter embodying the teachings of this invention; and FIG. 2 is a fragmentary cross-sectional view of a device incorporating an alternative embodiment of the invention.

With reference to FIG. 1, the flowmeter shown therein is of the axial flow, two element, angular momentum type and generally comprises a main housing 10 having a longitudinal bore in which is received a rotatable fluid accelerating impeller 22 rotatably mounted on a telemetering device housing 14 inserted in one end of the bore. The impeller is operatively associated with a turbine 16 disposed in collinear alignment with the impeller and mounted for limited movement about the impeller axis under the control of a restraining spring 18. This portion of the flowmeter is functionally similar to the flowmeter disclosed in United States Patent 2,714,310, issued August 2, 1955, in the name of Frederic B. Jennings. In the interest of brevity, further description of the structure and operation of this portion of the flowmeter will be omitted, inasmuch as the operation and function thereof may be fully understood by reference to the aforementioned patent.

The housing 10 of the flowmeter is further provided with a generally cylindrical recess 20 in which is received, in sealed relation, a motor and drive unit housing 22. The drive unit housing 22 is generally in the form of a cylinder in which is received at one end an electric drive motor 24. The drive motor 24 is connected through reduction gearing 26, disposed within the housing 22, to a driving member or magnet carrier 28 mounted on a hub 30 supported on bearings on a fixed shaft 32. The magnet carrier 28 carries a plurality of circularly arranged permanent magnets 34 disposed concentrically of the shaft 32. The shaft 32 is supported at one end on a diaphragm or seal member 36 extending across the inner end of the cylinder forming the drive unit housing 22 and preferably welded or otherwise secured to the cylinder 22 thus providing a fluid tight seal between the interior of the housing 22 and the remainder of the interior of the housing 10. In the specific embodiment shown, the seal 36 seats on an internal annular shoulder 38 on the main housing 10.

Disposed on the opposite side of the seal member 36 from the magnets 34 is a second magnet carrier or driven member 40 mounted on a hub 42 rotatably supported by bearings on a fixed shaft 44 supported at one end on a boss on the main housing 10 and at its other end by the seal member 36. The carrier 40 mounts a plurality of circularly arranged magnets 46 disposed concentrically of the shaft 42 and cooperating with the magnets 34 to provide a magnetic drive connection between the driving member 28 and driven member 40. The carrier 40 is peripherally toothed and is engaged with an idler gear 48 which in turn is drivingly engaged with teeth 50 arranged about the periphery of the impeller 12.

In the use of a mass flowmeter of the type shown, the main housing is coupled in series with a fluid conduit to provide a flow of fluid past the impeller and turbine with the result that the interior of the main housing 10 will be filled with the fluid, the mass flow rate of which it is desired to measure. The pressure of the fluid in the housing may in many cases be relatively high and this pressure will, as is obvious from FIG. 1, act upon the side of the seal 36 facing the magnets 46. Inasmuch as it is desirable to maintain the drive motor and associated gearing in a fluid free environment, the components on this side of the sealed member 36 will be at substantially atmospheric pressure. Accordingly, the full pressure of the fluid within the housing 10 will be acting across the diaphragm or seal 36.

In order to provide the seal with a construction able to withstand such differences of pressure while at the same time minimize the air gap between the cooperating magnets 34 and 46, the portion of the seal member registering with the locus of the magnets is constructed of relatively thin material and further is constructed to have oppositely facing surfaces of revolution on opposite sides thereof and facing the magnets, with said surfaces of revolution being arranged concentrically of the magnet axis and inclined toward the axis of one of the sets of magnets. This general configuration is accomplished in the specific embodiment shown in FIG. 1 by providing a generally dished or convexo-concave seal member having its convex side extending into the high pressure portion of the device. It is to be understood, however, that the specific geometric configuration of the seal member may be widely varied, the necessary requirements being the provision of the surfaces of revolution registering with the locus of the magnets in order to permit this portion of the seal member to be made of relatively thin material so as to minimize the air gap between the magnets while at the same time being able to withstand a high fluid pressure differential across the seal. In order to further minimize the air gap between the magnets, the pole faces 35 and 47 of the magnets 34 and 46, respectively, are shaped generally complementary to the opposite facing surfaces of revolution of the seal, thus providing a magnetic drive assembly having the advantages of both the axial and radial types of couplings while eliminating the disadvantages thereof.

As an example of the advantages of the structure of this invention, in a specific embodiment wherein the pressure differential across the seal member was approximately 1600 p.s.i., the teachings of this invention permitted the reduction of the thickness of the seal member from approximately .128 inch, in the case of a flat diaphragm, to approximately .035 inch, utilizing a convexo-concave seal member of the type shown in FIG. 1, with an attendant increase in the torque transmitting efficiency, for the same size magnets, from a marginal condition to a condition wherein the torque transmitted was substantially in excess of that required.

With reference to FIG. 2, there is shown a magnetic drive assembly incorporating an alternative embodiment of the present invention in combination with a flowmeter of the type shown in FIG. 1. The flowmeter generally comprises a housing 110 in which is disposed an impeller 112 and turbine 114. A secondary housing 111 is mounted on the main housing 110 and has an opening 113 registering with an opening 115 in the main housing 110. The secondary housing 111 contains a magnet carrier 140 generally similar to the magnet carrier heretofore described which mounts a plurality of circularly arranged magnets 146. The carrier 140 is peripherally toothed and is mounted on a bearing 141 carried by a shaft 144 supported at one end on an internal web 145 of the housing 111. A convexo-concave seal member 136 is seated in an opening at one end of the housing 111 and is preferably welded to the housing 111 so as to provide permanent sealing of this end of the housing. The seal 136 is generally similar to the seal 36 previously described but has a central boss 137 which supports one end of the shaft 144.

A motor drive unit housing 122 is separably attached to the secondary housing 111 by bolts, not shown. The housing 122 contains a drive motor 124 connecting through a reduction gear train 126 to a magnet carrier 128 carrying magnets 134 which cooperate with the magnets 146 to provide a magnetic coupling. Magnet carrier 128 is mounted on a hub 130 rotatably carried by a shaft 132 journalled at one end in a central boss 139 of a second seal member 136'. The seal member 136' is shaped generally complementary to the seal 136 and is engaged in juxtaposition therewith. Seal 136' further has an annular peripheral skirt portion 143 telescopically received within one end of a sleeve member 127 which in turn is telescopically received within one end of the motor drive unit housing 122. The seal 136' is preferably welded about the outer end of the skirt 143 to the sleeve 127 to provide a permanent seal for this end of the motor drive unit housing.

The function and structural configuration of the seal members 136 and 136', as a unit, are generally the same as that of the seal 36 previously described, and the magnets 134 and 146 are similar in structure to the magnets 34 and 46 previously described. Further, as will be apparent, the relationships of the magnets to the seal members described in connection with FIG. 1 is also present in this alternative structure of FIG. 2. It will be understood, of course, that the total combined thickness of the composite seal formed by the seal members 136 and 136' need not be greater than the thickness of the previously described seal member 36 for the same differential fluid pressure, the scale in the drawing being purely illustrative in nature. All of the advantages of the embodiment of the invention shown in FIG. 1 are present in the alternative embodiment of FIG. 2 and further, as will be apparent from FIG. 2, the separability feature of the embodiment of FIG. 2 permits the motor and reduction gearing as well as the drive magnets 134 to be removed from the device without breaking the hermetic seal of the interior of the housings 111 and 110. Accordingly, in order to permit interchange of the motor or gearing, it would not be necessary to remove the flowmeter from the line in which it was installed, thus realizing a considerable savings in time and, particularly, obviating the necessity of interrupting the flow through the line in which the flowmeter is connected.

As in the case of the embodiment of FIG. 1, the seal structure sown in FIG. 2 may be varied in geometry, the only requirement being the provision of the surfaces of revolution on the portions of the seal members registering with the locus of the next adjacent magnets, together with the shaping of the pole faces of the magnets generally complementary to the next adjacent surface of revolution on the seal members. It should be understood that the term "generally complementary" as applied to the pole faces of the magnets includes not only the case where the pole faces are substantially complementary to the next adjacent seal surface but also cases such as where the faces are, say, flat and inclined to the magnet axes while the next adjacent seal surfaces are two or three dimensionally curved.

As will be apparent to those skilled in the art, this invention is not necessarily limited to mass flowmeters and, further, many variations or alternative structures may be employed without departing from the scope of the invention. Accordingly, the foregoing description and drawings are to be taken only in an illustrative sense and not as limiting the invention, it being the intention that the invention shall be limited only by the appended claim which shall include within its scope all structure which logically falls within the language thereof.

What I claim as new and desire to secure by Letters Patent of the United States is:

A magnetic drive assembly comprising a first housing, a driving member rotatably mounted in said housing, a second housing, means separably attaching the first housing to said second housing, a driven member rotatably mounted in said second housing in collinear spaced relation to the driving member, magnets mounted for rotation with the driving and driven members, said magnets having cooperating pole faces facing in opposite directions axially of said member and forming a magnetic coupling, and a composite separable seal providing a fluid tight seal between the housings extending generally radially of the axes of said members and between said pole faces of said magnets, said seal comprising a pair of mating separable seal members having a convexo-concave cross section respectively carried by said housings with the portions of the seal members registering with the locus of said pole faces being provided with surfaces of revolution facing said pole faces with said surfaces of revolution being disposed coaxially of said driving and driven members and being inclined in the same direction toward the axis of one of said driving and driven members, said pole faces of the magnets being disposed next adjacent the seal and being generally complementary to the next adjacent surface of revolution of said seal.

References Cited in the file of this patent

UNITED STATES PATENTS

| | | |
|---|---|---|
| 1,568,304 | Williams | Jan. 5, 1926 |
| 1,748,577 | Merriam | Feb. 25, 1930 |
| 2,577,282 | Sliwinski | Dec. 4, 1951 |
| 2,814,949 | Bodge | Dec. 3, 1957 |

FOREIGN PATENTS

| | | |
|---|---|---|
| 1,033,395 | France | Apr. 1, 1933 |